United States Patent
Sueoka et al.

(10) Patent No.: US 7,537,719 B2
(45) Date of Patent: May 26, 2009

(54) METHOD OF MANUFACTURING RESIN BOOT FOR CONSTANT-VELOCITY UNIVERSAL JOINT

(75) Inventors: Kazuhiko Sueoka, Ageo (JP); Yasuji Takada, Ageo (JP)

(73) Assignee: Fukoku Co., Ltd., Saitama-ken (JP)

( * ) Notice: Subject to any disclaimer, the term of this patent is extended or adjusted under 35 U.S.C. 154(b) by 895 days.

(21) Appl. No.: 10/920,314

(22) Filed: Aug. 18, 2004

(65) Prior Publication Data

US 2005/0134009 A1    Jun. 23, 2005

(30) Foreign Application Priority Data

Dec. 22, 2003   (JP)   ............................. 2003-423942
Apr. 27, 2004   (JP)   ............................. 2004-131961

(51) Int. Cl.
*B29C 45/14*   (2006.01)

(52) U.S. Cl. ...................... 264/268; 264/269; 264/275; 264/274; 264/334

(58) Field of Classification Search ....................... None
See application file for complete search history.

(56) References Cited

U.S. PATENT DOCUMENTS

| | | | | |
|---|---|---|---|---|
| 4,341,317 | A * | 7/1982 | Suzuki et al. | 215/42 |
| 5,529,538 | A * | 6/1996 | Schulz et al. | 464/111 |
| 6,402,999 | B1 * | 6/2002 | Sadr et al. | 264/68 |
| 6,695,706 | B2 * | 2/2004 | Furuta | 464/175 |
| 7,056,219 | B2 * | 6/2006 | Toriumi et al. | 464/175 |

FOREIGN PATENT DOCUMENTS

| | | |
|---|---|---|
| CA | 2048448 | 2/1992 |
| JP | 60002325 | 1/1985 |
| JP | 05008285 | 1/1993 |
| JP | 05272640 | 10/1993 |
| JP | 2003-41317 | 2/2003 |
| JP | 2003222155 | 8/2003 |

\* cited by examiner

*Primary Examiner*—Edmund H. Lee
(74) *Attorney, Agent, or Firm*—Jacobson Holman PLLC (57) ABSTRACT

There is disclosed a manufacturing apparatus and method which are capable of smoothly removing a tripod boot integrated by secondary molding from a core without deforming the boot and which are superior in manufacturing efficiency and which are inexpensive, and a resin boot for a constant-velocity universal joint. The apparatus includes: divided molds which hold a primarily molded resin boot main body from the outside; a core which holds the boot main body from the inside; a runner mechanism which injects/charges a molten resin material into a secondary molding space formed between the core and an other-end annular fastening portion; and an ejection mechanism for removing the tripod boot in which portions having different thicknesses are integrally and secondarily molded on an inner periphery of the other-end annular fastening portion from the core. The ejection mechanism is provided with a plurality of ejectors in positions avoiding gates of the runner mechanism, and ejecting forces are applied onto lower end surface of the other-end annular fastening portion of the tripod boot from the ejectors to stably and smoothly remove the tripod boot from the core.

12 Claims, 8 Drawing Sheets

METHOD OF MANUFACTURING RESIN BOOT FOR CONSTANT-VELOCITY UNIVERSAL JOINT

BACKGROUND OF THE INVENTION

The present invention relates to a manufacturing apparatus and a manufacturing method for a resin boot for a constant-velocity universal joint, and a resin boot for a constant-velocity universal joint, which protects the constant-velocity universal joint for use, for example, in driving shafts or propeller shafts of cars.

PRIOR ART

Various types of boots for constant-velocity universal joints (e.g., boots for constant-velocity universal joints on an inboard side (engine side) and on an outboard side (tire side)) are attached to the constant-velocity universal joints for use, for example, in driving shafts or propeller shafts of cars in order to seal grease which is a lubricant and to prevent invasion of dust, water and the like from the outside.

Figure 8A:
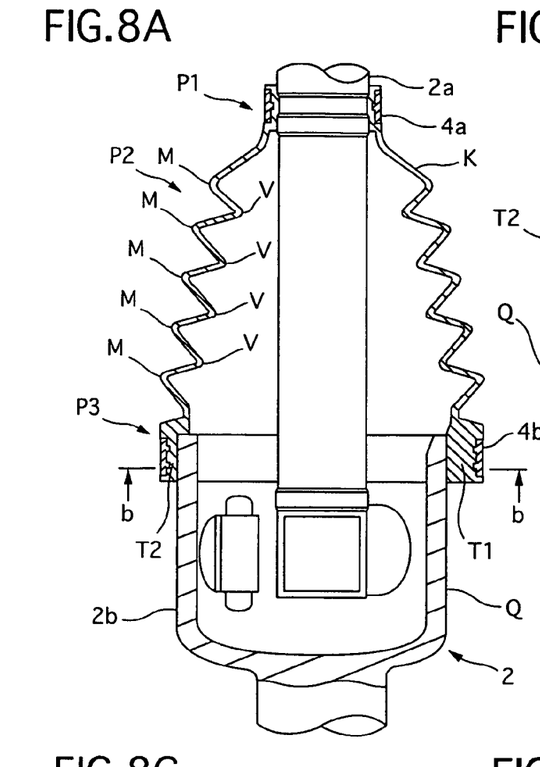
FIG. 8A is a sectional view of the resin boot for the constant-velocity universal joint, attached to a tripod joint.
Figure 8B:
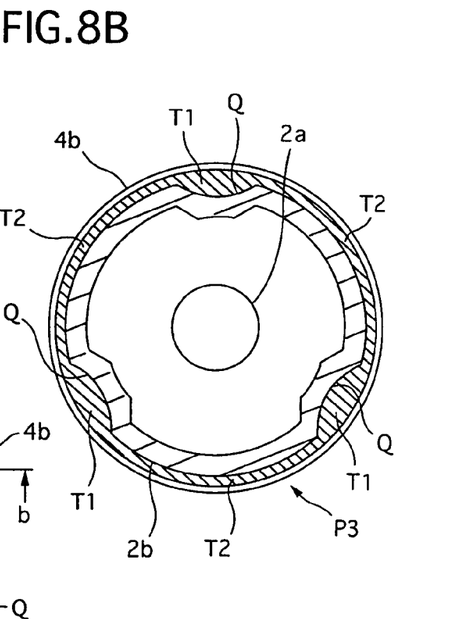
FIG. 8B is a sectional view along a b-b line of FIG. 8A.

For example, as shown in FIGS. 8A and 8B, in a boot for a constant-velocity universal joint, a one-end annular fastening portion P1 which can be fastened to a shaft portion 2a of a constant-velocity universal joint 2 is disposed on one end, and an another-end annular fastening portion P3 which can be fastened to a gear housing (outer sleeve) 2b of the constant-velocity universal joint 2 is disposed on the other end. An annular bellows portion P2 elastically deformable following an angle change of the shaft portion 2a with respect to that of the gear housing 2b of the constant-velocity universal joint 2 is disposed between the one-end annular fastening portion P1 and the other-end annular fastening portion P3.

The annular bellows portion P2 is formed in a hollow conical shape in which a plurality of annular mountain portions M and annular valley portions V are alternately combined toward the other-end annular fastening portion P3 from an annular shoulder portion K continued to the one-end annular fastening portion P1. By this constitution, the annular bellows portion P2 is maintained in an elastically expandable/contractible deformable state.

Moreover, the one-end annular fastening portion P1 and the other-end annular fastening portion P3 are provided with band attaching portions 6a, 6b (see FIGS. 8C and 8D) for attaching a band 4a to be fastened to one end and a band 4b to be fastened to the other end. When the band 4a to be fastened to one end and the band 4b to be fastened to the other end are attached and tightened to the band attaching portions 6a, 6b, the one-end annular fastening portion P1 can be fastened to the shaft portion 2a of the constant-velocity universal joint 2. Moreover, the other-end annular fastening portion P3 can be fastened to the gear housing 2b of the constant-velocity universal joint 2.

As the constant-velocity universal joint 2, a tripod joint is known in which concave spherical portions Q are disposed in a plurality of positions (e.g., at equal intervals in three positions) of the gear housing 2b for a purpose of thinning or lightening the gear housing 2b. In this case, an inner periphery of the other-end annular fastening portion P3 of the boot for the constant-velocity universal joint needs to be formed to have portions having different thicknesses (thick portions T1 disposed opposite to the concave spherical portions Q, and other thin portions T2) in order to match an outer peripheral shape (three concave spherical portions Q) of the gear housing 2b of the constant-velocity universal joint 2.

Figures 8C, 8D:
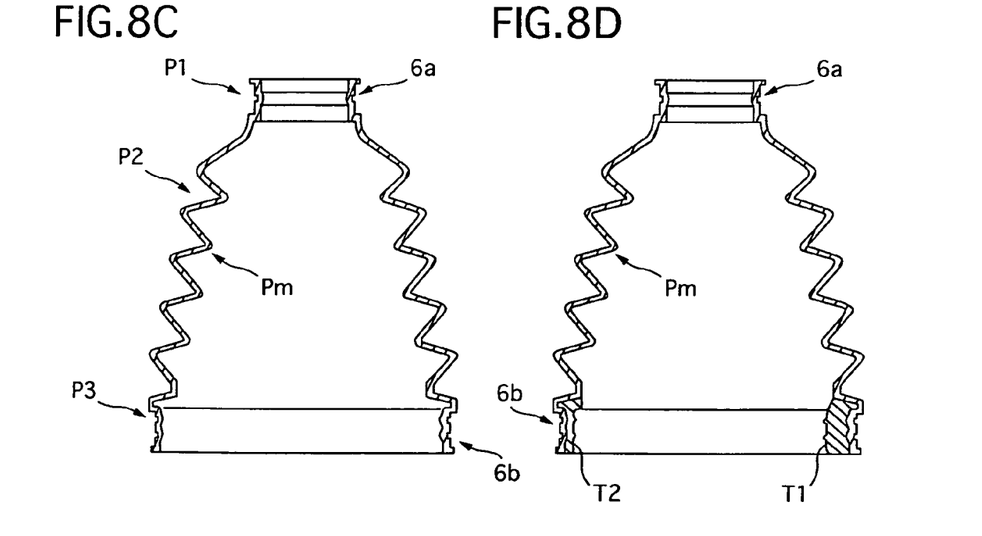
FIG. 8C is a sectional view of a boot main body which is a primary molded member.
FIG. 8D is a sectional view of the resin boot for the constant-velocity universal joint (tripod boot) integrated by the secondary molding.

As a method of manufacturing the boot for the constant-velocity universal joint, a manufacturing method described, for example, in Patent Document 1 is usable. According to the method, first in a primary molding step, a boot main body Pm (FIG. 8C) constituted of the one-end annular fastening portion P1, annular bellows portion P2, and other-end annular fastening portion P3 is integrally molded of a molten resin material (thermoplastic resin). Next, in a secondary molding step, in a state in which an inner periphery of the other-end annular fastening portion P3 of the boot main body Pm formed of the resin is set into a core (not shown) and an outer periphery of the other-end annular fastening portion P3 is held in a mold (not shown), the thermoplastic resin is injected by a runner mechanism to integrally mold the thick portions T1 and the thin portions T2 with the inner periphery of the other-end annular fastening portion P3 (FIG. 8D). By these molding steps, a boot for a tripod joint which is a secondary molded member is completed.

Additionally, as a method of taking a blow molded member (the boot for the constant-velocity universal joint including the annular bellows portion) out of the core, for example, a method is general in which air is blown from the core to expand the boot, and simultaneously a part of the boot is grasped and pulled out (removed or released from a mold).

However, in the boot for the tripod joint (FIG. 8D) manufactured by the above-described method, the one-end annular fastening portion Pi of the primary molded member (boot main body Pm) is opened (FIG. 8C). Therefore, even when air is blown out of the core in which the other-end annular fastening portion P3 is set (fitted), all the air fed into the boot for the tripod joint (hereinafter referred to as the tripod boot) is released to the outside from the opened one-end annular fastening portion P1. Therefore, the method in which the air is blown out of the core to expand the tripod boot and simultaneously a part of the tripod boot is grasped and pulled out cannot be used.

In this case, the use of a method in which the tripod boot is pulled out of the core by a manual operation is also considered, but labor and time are required, and personnel expenses have also piled up. As a result, a manufacturing efficiency of the tripod boot drops and a manufacturing cost rises. When the tripod boot is to be forcibly pulled out of the core by the manual operation, the tripod boot is sometimes deformed.

To remove (release) the tripod boot which is a second molded member from the mold, and further to simultaneously realize enhancement of efficiency and reduction of cost of the manufacturing method, for example, a method is preferable in which the existing ejection mechanism is used and the tripod boot is automatically removed from the core. According to the method, when the other-end annular fastening portion P3 of the tripod boot is extruded from the core by the ejector, the tripod boot can be automatically and easily removed from the core in a short time.

However, in the manufacturing method of the tripod boot, a cooled state of the other-end annular fastening portion P3 of the tripod boot after (immediately after) the second molding is not complete (in a soft state in which the portion does not completely solidify (harden). Therefore, when the other-end annular fastening portion P3 of the boot is extruded out of the core by the ejector, a portion on which an extruding force of the ejector acts is compressed in a vertical direction (extruding direction of the ejector) to expand in a lateral direction, the portion is pressure-welded to the core, and the tripod boot which is the second molded member is not easily removed (released) from the core in some case. When the tripod boot is forcibly removed from the core in this state, the portion pressure-welded to the core is deformed. In this case, to smooth remove the tripod boot from the core without deforming the tripod boot (especially the other-end annular fastening portion P3), a position of the ejector with respect to the other-end annular fastening portion P3, and a shape of an abutment surface of the ejector abutting on the other-end annular fastening portion P3 need to be considered.

Moreover, since constitutions (runner mechanisms) for injecting the thermoplastic resin at a secondary molding time are disposed at a predetermined interval along the inner periphery of the other-end annular fastening portion P3, positioning of the ejector in a position avoiding the constitution needs to be considered.

SUMMARY OF THE INVENTION

An object of the present invention is to provide a manufacturing apparatus and a manufacturing method for a resin boot for a constant-velocity universal joint, and a resin boot for a constant-velocity universal joint, superior in manufacturing efficiency and inexpensive, in which the boot (tripod boot) for the constant-velocity universal joint, formed of the resin and integrated in secondary molding, can be smoothly removed from a core without being deformed.

To achieve the object, according to the present invention, there are provided a manufacturing apparatus and a manufacturing method in which a boot main body primarily molded and formed of a resin is held in an injection mold, a molten resin material is injected/charged in a secondary molding space formed in the injection mold in this state, portions having different thicknesses are secondarily molded on an other-end annular fastening portion of the boot main body to constitute a boot for a constant-velocity universal joint, formed of the resin, and thereafter the boot for the constant-velocity universal joint, formed of the resin, can be removed from the injection mold.

Concretely, a manufacturing apparatus of a boot for a constant-velocity universal joint, formed of a resin, comprises: divided molds which hold a primarily molded resin boot main body from the outside; a core which holds the boot main body from the inside; a runner mechanism which injects/charges a molten resin material into a secondary molding space constituted of a thick portion molding space and a thin portion molding space formed between the core and an other-end annular fastening portion, between the divided molds and the other-end annular fastening portion, or between the core and the divided molds via the other-end annular fastening portion; and an ejection mechanism for removing, from the core, the resin boot for the constant-velocity universal joint in which the molten resin material is charged into the secondary molding space to integrally and secondarily mold portions having different thicknesses, constituted by combining a thickness of the molten resin material in the secondary molding space with that of the boot main body on the other-end annular fastening portion.

In this case, injecting/charging gates for injecting/charging the molten resin materials onto optional one or a plurality of positions of the secondary molding space are disposed in the runner mechanism, and a plurality of ejectors are disposed in positions avoiding the injecting/charging gates of the runner mechanism in the ejection mechanism. Moreover, when predetermined ejecting forces are applied onto lower end surfaces of the portions having different thicknesses in the other-end annular fastening portion of the resin boot for the constant-velocity universal joint from a plurality of ejectors, the resin boot for the constant-velocity universal joint can be removed from the core.

In the present invention, the ejectors are disposed at predetermined intervals along the lower end surface in positions which do not contact the core, so that uniform ejecting forces are applied onto the lower end surface of the other-end annular fastening portion of the resin boot for the constant-velocity universal joint.

Concretely, the ejectors are disposed along the lower end surface in order to individually apply the ejecting forces onto the lower end surface of a portion in which a thin portion is molded, the lower end surface of a portion in which a thick portion is molded, and the lower end surface of a portion which extends over both the thick and thin portions in the portions having different thicknesses, or to simultaneously apply the ejecting forces onto two or more lower end surfaces selected and combined optionally from these lower end surfaces.

Moreover, a tip of the ejector is provided with an abutment surface which abuts on the lower end surface of the other-end annular fastening portion to apply the ejecting force, and at least the abutment surface has such a shape that a contact area with respect to the lower end surface increases.

In this case, at least the abutment surface of the ejector may have a circular shape or a broad shape which does not contact the core during the abutting on the lower end surface of the other-end annular fastening portion and which extends along the lower end surface of the thin portion of the other-end annular fastening portion.

According to the present invention, a plurality of ejection mechanisms (ejectors) are disposed in the positions avoiding the runner mechanism, the ejecting forces from the ejectors are applied onto the lower end surface of a tripod boot integrated by the secondary molding, and accordingly the tripod boot can be smoothly removed from the core with good efficiency.

Moreover, at least the abutment surface of the tip of the ejector is formed in such a shape (e.g., the circular shape, the broad shape) that the contact area with respect to the lower end surface of the other-end annular fastening portion increases. Accordingly, the uniform ejecting force can be exerted onto the lower end surface. As a result, the tripod boot integrated by the secondary molding can be efficiently removed from the mold without being deformed.

In the present invention, there is also provided a resin boot for a constant-velocity universal joint manufactured by the above-described manufacturing apparatus, wherein a one-end annular fastening portion which can be fastened to a shaft portion of a constant-velocity universal joint is disposed on one end, the other-end annular fastening portion which can be fastened to a gear housing of the constant-velocity universal joint and which has portions having different thicknesses is disposed on the other end, and an annual bellows portion elastically deformable following a relative angle change between the shift portion and the gear housing of the constant-velocity universal joint is disposed between the one-end annular fastening portion and the other-end annular fastening portion.

Moreover, in the present invention, there is provided a resin boot for a constant-velocity universal joint including portions having different thicknesses formed by an injection molding on the other-end annular fastening portion of the primarily molded resin boot main body, wherein the boot main body is held in the vicinity of the other-end annular fastening portion from the inside by a core when injection molding and the boot main body is removed from the core by ejecting forces which are applied onto a lower end surface of portions having different thicknesses molded by injection at the inner periphery side and/or the outer periphery side of the other-end annular fastening portion after completion of injection molding.

In this case, the boot main body is held in the vicinity of the other-end annular fastening portion from the inside by a core when injection molding and the boot main body is removed from the core by ejecting forces which are applied onto a lower end surface at least at one side of the portions having different thicknesses molded by injection at either or both of the inner periphery side and the outer periphery side of the other-end annular fastening portion after completion of injection molding.

DESCRIPTION OF THE PREFERRED EMBODIMENT

A manufacturing apparatus and method for a resin boot for a constant-velocity universal joint of the present invention will be described with reference to the accompanying drawings. It is to be noted that in the following description, a boot for a tripod joint (hereinafter referred to as the tripod boot) described above with reference to FIGS. 8A and 8B will be illustrated as an embodiment of the resin boot for the constant-velocity universal joint.

In the present embodiment, in the manufacturing apparatus and method of the tripod boot, an other-end annular fastening portion P3 of the tripod boot integrated by secondary molding can be smoothly removed (released) from a core 18 (see FIGS. 1C and 3A) without being deformed.

Figure 1A:
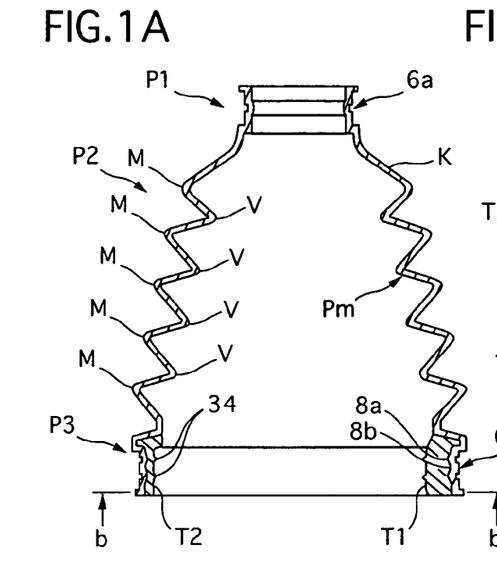
FIG. 1A is a sectional view showing a constitution of a resin boot for a constant-velocity universal joint according to an embodiment of the present invention.
Figure 1B:
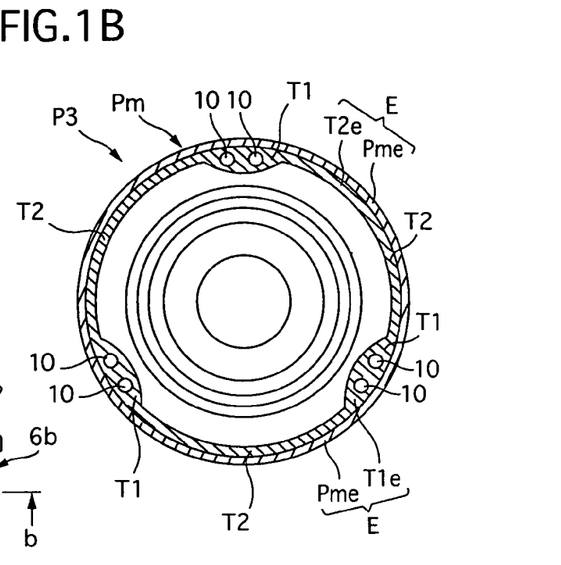
FIG. 1B is a sectional view along a b-b line of FIG. 1A.

As shown in FIGS. 1A ad 1B, to constitute the tripod boot of the present embodiment, a boot main body Pm (see FIG. 8C) is integrally molded by a molten resin material (thermoplastic resin) in the existing primary molding step. Thereafter, in a secondary molding step, a portion which matches an outer peripheral shape (three concave spherical portions Q) of a tripod joint 2 (see FIG. 8A) and which has different thicknesses (portion including thick portions T1 disposed facing the respective concave spherical portions Q and other thin portions T2) is integrally molded of the thermoplastic resin in an inner periphery of the other-end annular fastening portion P3 of the boot main body Pm.

It is to be noted that the molten resin material such as polyester-based thin portion elastomer is usable as the thermoplastic resin, and another resin material may also be used in accordance with a use purpose or environment of the tripod boot.

Convex portions 8a and concave portions 8b having different heights along a peripheral direction are alternately formed in a vertical direction in the inner periphery of the other-end annular fastening portion P3 of the boot main body Pm which is a primary molded member. This can enhance adhesion to the portions of the tripod boot integrated by the secondary molding and having different thicknesses (portions constituted by combining the thickness of the boot main body Pm with the thicknesses of the thick portions T1 and thin portions T2). That is, the inner periphery of the other-end annular fastening portion P3 of the boot main body Pm is solidly and closely attached to and integrated with the portions having different thicknesses (thick portions T1, thin portions T2).

It is to be noted that the thickness of the boot main body Pm (one-end annular fastening portion P1, annular bellows portion P2, other-end annular fastening portion P3) is set to an optimum thickness in accordance with a use purpose or environment of the tripod boot, and therefore numerical values are not limited herein.

Moreover, portions having different thicknesses (thick portions T1, thin portions T2) which are secondarily molded in the inner periphery of the other-end annular fastening portion P3 of the tripod boot are constituted by an optional combination in optional positions in accordance with an outer peripheral shape of a gear housing 2b of the tripod joint 2 (see FIG. 8A). In the present embodiment, the thick portions T1 and thin portions T2 are alternately and continuously molded at equal interval along the peripheral direction (see FIG. 1B).

Figure 4A:
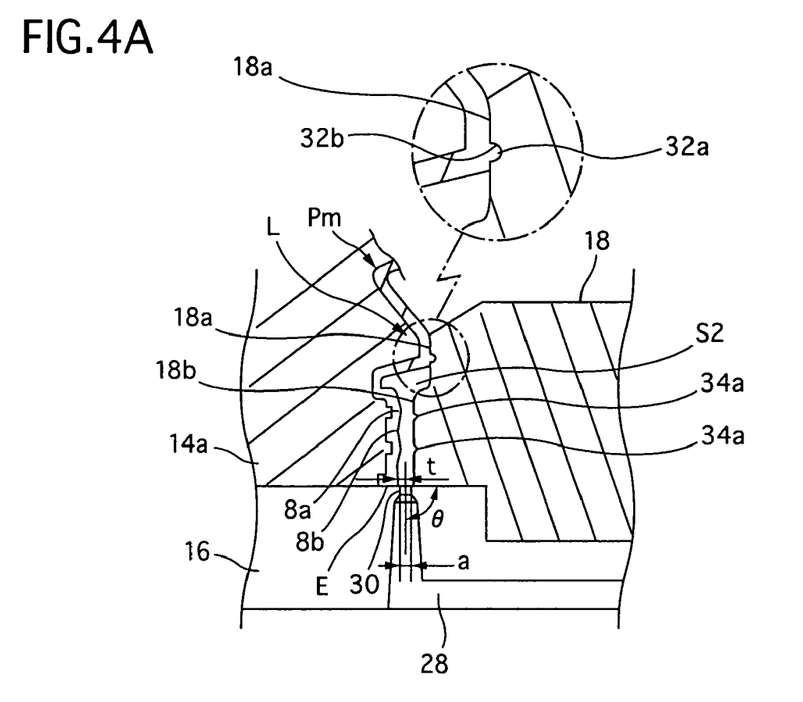
FIG. 4A is a sectional view showing a partial constitution of a secondary molding space (between the core and the other-end annular fastening portion) in the injection mold.
Figure 4B:
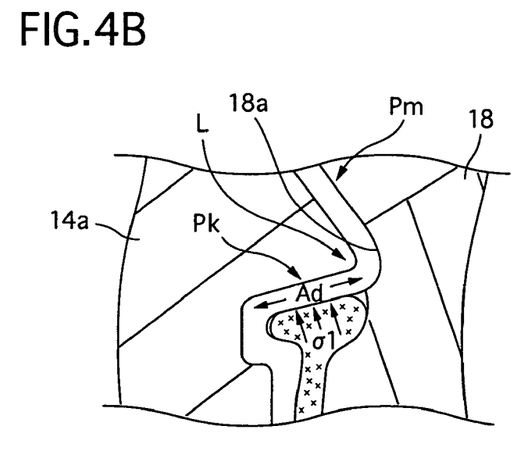
FIG. 4B is an enlarged sectional view of the secondary molding space of FIG. 4A.
Figure 4C:
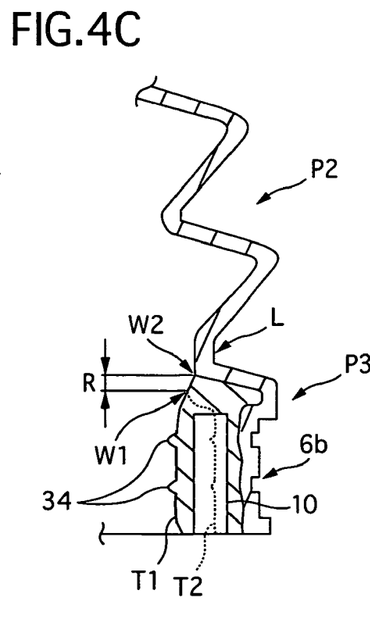
FIG. 4C is a sectional view for defining a molding positional relation between the secondarily molded thick and thin portions.

Here, when the thicknesses of the thick portions T1 and thin portions T2 in a diametric direction are noted, for example, in FIG. 4C, a solid-line portion shows the thick portion T1, a dotted-line portion shows the thin portion T2, a range shown by R is a thickness common portion of the thick and thin portions T1, T2 in the diametric direction, and the common portion has an equal thickness in the peripheral direction. Moreover, a position shown by W1 indicates a boundary of the thickness in the diametric direction between the thick and thin portions T1, T2.

The thick portions T1 are protruded from the thin portions T2 in convex spherical shapes in an inner diametric direction to adhere and fit into the concave spherical portions Q of the tripod joint 2 (see FIGS. 8A and 8B). In this case, a depth of the thick portion T1 (edge of the thick portion T1 in the vicinity of the annular bellows portion P2) is set not to be superimposed on a boundary region L between the other-end annular fastening portion P3 and the annular bellows portion P2 of the tripod boot. Concretely, the depth of the thick portion T1 is defined in a position W2 in the vicinity of the other-end annular fastening portion P3 from an inner wall of the boundary region L.

On the other hand, the inner diameter of the thin portion T2 is set to a curvature in such a manner that the thin portions closely adhere to the outer periphery (outer periphery of the gear housing 2b) of the tripod joint 2 excluding the concave spherical portions Q, and a boundary W1 of the thin portion T2 is set not to be superimposed on the boundary region L.

When the depth W2 of the thick portion T1 and the boundary W1 of the thin portion T2 are set not to obstruct the boundary region L between the other-end annular fastening portion P3 and the annular bellows portion P2 in this manner, cracks by a stress generated around the inner surface of the boundary region L can be prevented from being generated.

It is to be noted that conditions such as shapes, numbers, thicknesses, widths, and depths of the thick and thin portions T1, T2 can be appropriately designed/changed in accordance with the outer peripheral shape of the tripod joint 2, and therefore the numerical values are not limited here.

As shown in FIGS. 1B, 2A to 2D, and 4C, two cylindrical concave portions 10 disposed in parallel with each other along an axial direction of the tripod boot are molded in each thick portion T1. By these cylindrical concave portions 10, turbulent flows are remarkably reduced, when the molten resin material (thermoplastic resin) flows through a thick portion molding space S1 (see FIG. 1C) at a secondary molding time, and a fusing defect or air entrainment is prevented from occurring.

Moreover, in the drawings, two cylindrical concave portions 10 are disposed in each thick portion T1, but the number of the concave portions is not limited, and, for example, one or three or more concave portions may also be disposed. Moreover, an inner shape of the cylindrical concave portion 10 is not limited to a shown cylindrical shape, and optional shapes such as a conical shape, triangular pole shape, square pole shape, and a rectangular shape can be selected.

It is to be noted that the other constitution is the same as that of the tripod boot described above with reference to FIG. 8A, the same portions are denoted with the same reference numerals, and the description is omitted. Further in FIGS. 2A to 2D, a portion secondarily molded of the thermoplastic resin is hatched, and the boot main body Pm is shown in an outline.

Next, a manufacturing apparatus and method for the above-described tripod boot will be described.

Figure 1C:
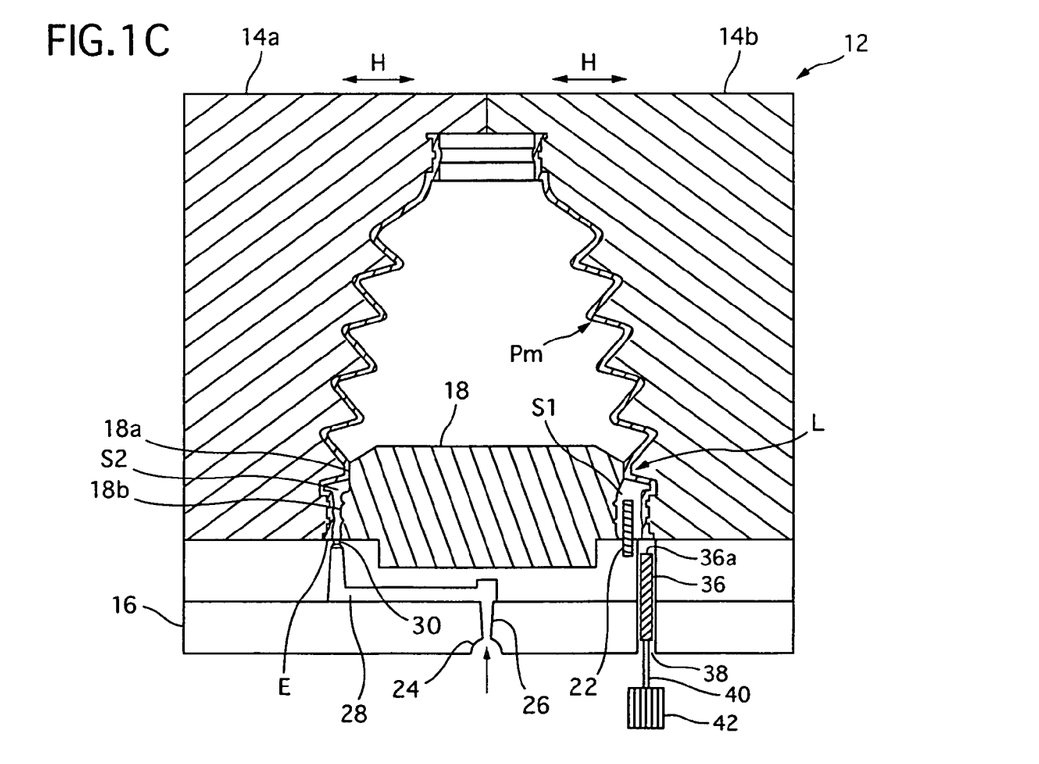
FIG. 1C is a sectional view showing a state just before a molten resin material is injected/charged into a secondary molding space in a state in which a primarily molded resin boot main body is held in an injection mold.

FIG. 1C shows an example of the manufacturing apparatus of the present embodiment. In a constitution of the manufacturing apparatus, in a state in which the primarily molded boot main body Pm formed of a resin is held in an injection mold 12, a molten resin material is injected/charged into a secondary molding space (S1, S2) formed in the injection mold 12. The portions having different thicknesses are integrated with the inner periphery of the other-end annular fastening portion P3 of the boot main body Pm to constitute the tripod boot. Thereafter, the tripod boot is removed from the injection mold 12 (released from the mold).

Concretely, the manufacturing apparatus of the present embodiment includes: divided molds 14a, 14b which hold the primarily molded resin boot main body Pm from the outside; the core 18 which holds the boot main body Pm from the inside; a runner mechanism which injects/charges the molten resin material (e.g., the thermoplastic resin such as polyester-based thermoplastic elastomer) into the secondary molding space (S1, S2) formed between the core 18 and the other-end annular fastening portion P3; and an ejection mechanism for removing, from the core 18, the tripod boot in which the molten resin material is charged into the secondary molding space to integrally and secondarily mold portions having different thicknesses, constituted by combining a thickness of the molten resin material in the secondary molding space with that of the boot main body on the other-end annular fastening portion.

In the injection mold 12 for use in the manufacturing apparatus of the present embodiment, the divided molds 14a, 14b are constituted to be slidable in an arrow H direction on a fixed mold 16, and the core 18 is fixed to the fixed mold 16.

Figure 3A:
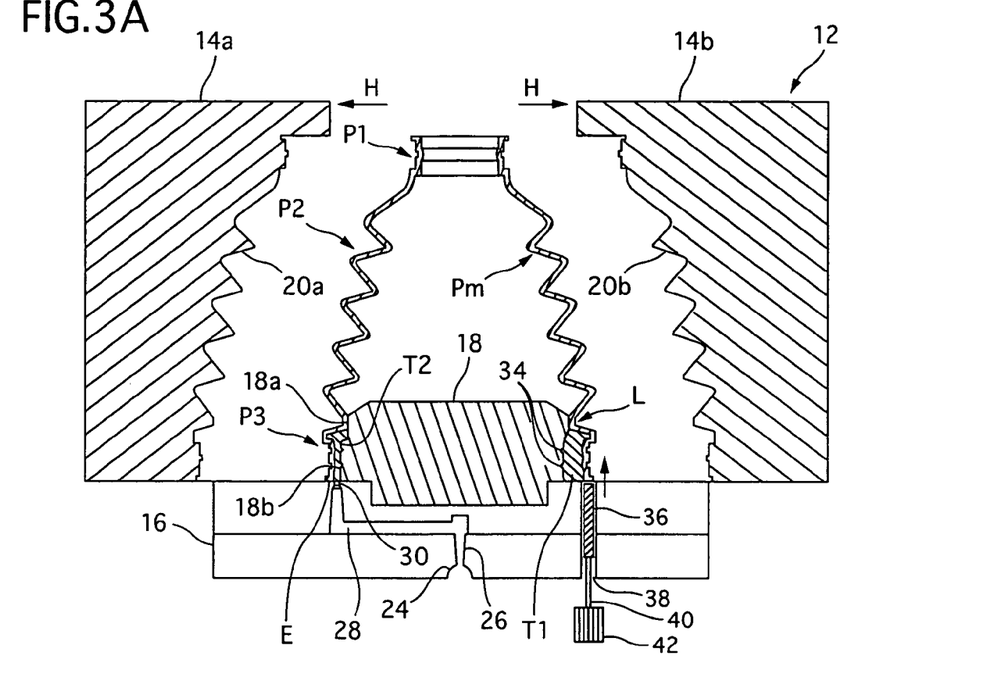
FIG. 3A is a sectional view showing that the resin boot for the constant-velocity universal joint is removed from the injection mold after secondary molding.

Inside the divided molds 14a, 14b, boot main body disposing spaces 20a, 20b (see FIG. 3A) are formed matching the outer shape of the resin boot main body Pm which is a primary molded member. After fitting the other-end annular fastening portion P3 of the boot main body Pm into the core 18 in a state in which the divided molds 14a, 14b are opened as shown in FIG. 3A, the molds are closed, and the boot main body Pm can be held and clamped in the injection mold 12. In this case, since particularly the boundary region L of the boot main body Pm (boundary region between the other-end annular fastening portion P3 and the annular bellows portion P2) is held stably between the divided molds 14a, 14b and the core 18, a secondary molding process can be performed with high precision without any molding shift.

It is to be noted that even by the use of a process in which the resin boot main body Pm of the primary molded member is inserted and held beforehand in the boot main body disposing spaces 20a, 20b and thereafter the core 18 is fitted and clamped into the other-end annular fastening portion P3, an effect similar to the above-described effect can be obtained.

Moreover, in inner configurations of the boot main body disposing spaces 20a, 20b, when at least the boundary region L (boundary region between the other-end annular fastening portion P3 and the annular bellows portion P2) of the boot main body Pm can be stably held, the configuration of the other space does not have to match the outer configuration of the boot main body Pm, and there may also be a little gap.

The outer periphery of the core 18 is provided with: an annular fitting portion 18a which fits into an annular inner wall of the boundary region L of the boot main body Pm (boundary region between the other-end annular fastening portion P3 and the annular bellows portion P2); and a secondary molding defining portion 18b which defines ranges of the secondarily molded portions having different thicknesses (thick portion T1, thin portion T2) on the inner periphery of the other-end annular fastening portion P3.

In this constitution, for example, in a state in which the divided molds 14a, 14b are opened as shown in FIG. 3A, the other-end annular fastening portion P3 of the boot main body Pm which is the primary molded member is fitted into the core 18, and a lower end surface E of the other-end annular fastening portion P3 is allowed to abut on the fixed mold 16. Then, the annular fitting portion 18a fits into the annular inner wall of the boundary region L of the boot main body Pm, and accordingly the boot main body Pm can be stably positioned/set with respect to the core 18. Moreover, in this state, the secondary molding space (thick portion molding space S1 and thin portion molding space S2) for secondarily molding the portions having different thicknesses (thick portion T1, thin portion T2) is formed between the secondary molding defining portion 18b and the inner periphery of the other-end annular fastening portion P3 (see FIG. 1C).

In this case, the secondary molding space constituted of the thick portion molding space S1 and the thin portion molding space S2 can be optionally set in accordance with the outer shape of the tripod joint 2 to which the tripod boot is to be attached. In the present embodiment, as an example shown in FIGS. 8A and 8B, the tripod joint 2 is assumed in which three concave spherical portions Q are disposed at equal intervals on the outer periphery of the gear housing 2b. Therefore, to match the tripod joint, the secondary molding space is formed in which three thick portion molding spaces S1 are formed at equal intervals and the thin portion molding spaces S2 are disposed between the thick portion molding spaces.

Moreover, the region where the secondary molding space is formed is set based on various conditions shown in FIG. 4 in such a manner that the depth W2 of the thick portion T1 and the boundary W1 of the thin portion T2 do not overlap with the boundary region L between the other-end annular fastening portion P3 and the annular bellows portion P2.

Furthermore, to mold one or two cylindrical concave portions 10 in the thick portion T1, a rod 22 for molding the cylindrical concave portion (see FIG. 1C) may be disposed toward the thick portion molding space S1 from the fixed mold 16. In this case, when the rod 22 for molding the cylindrical concave portion is pulled out of the thick portion molding space S1 filled with the thermoplastic resin after ending the secondary molding, the thick portion T1 including the cylindrical concave portions 10 can be integrally molded.

Additionally, the fixed mold 16 is provided with the runner mechanism for injecting/charging the thermoplastic resin into the above-described secondary molding space (see FIG. 1C). The runner mechanism communicates with an injecting/charging gate (hereinafter referred to as the gate) 30 from a sprue 26 bonded to a nozzle 24 of an injection molding machine (not shown). Moreover, the gate 30 is positioned facing the secondary molding space (thin portion molding space S2) formed between the core 18 and the other-end annular fastening portion P3. For example, as shown in FIGS. 2A to 2D, each gate 30 is positioned in a substantially middle of the thin portion molding space S2 disposed between the thick portion molding spaces S1 which are disposed at equal intervals in three positions. It is to be noted that in FIGS. 2A to 2D, three gates 30 are disposed at equal intervals, but if necessary, the position of the gate 30 may be shifted, or the number of gates 30 may also be increased. Moreover, each thick portion molding space S may also be provided with the gate 30.

According to the runner mechanism, the molten resin material plasticized by the injection molding machine is injected toward the inside of the thin portion molding space S2 from the gate 30 at a high speed in a state in which high temperature is maintained at 260° C. or more. At this time, since the thin portion molding space S2 extending to the thick portion molding space S1 from the gate 30 fulfills a function of a narrow runner, the molten resin material (thermoplastic resin) injected from the gate 30 is fed into the thick portion molding space S1 momentarily at the high speed while maintaining the high temperature. As a result, occurrence of an air or weld defect or the like can be eliminated.

It is to be noted that the gate 30 may be positioned facing the thick portion molding space S1 in such a manner that the thermoplastic resin is injected only from the thick portion molding space S1 or from a plurality of positions including the thick portion molding space S1. However, to prevent the occurrence of the air or weld defect, the gate 30 is preferably disposed facing the thin portion molding space S2.

When the high-temperature thermoplastic resin is injected into the thin portion molding space S2 from the gate 30 at the high rate, and especially when adhesion between the annular inner wall of the boundary region L of the boot main body Pm and the annular fitting portion 18a of the cylindrical concave portions 10 is not sufficient, the thermoplastic resin sometimes leaks therebetween.

To avoid this situation, in the present embodiment, for example, as shown in FIG. 4A, an annular convex portion 32a continuous in the peripheral direction is integrally molded with the annular inner wall of the boundary region L of the boot main body Pm at the primary molding time. Moreover, a annular concave portion 32b capable of fitting into the annular convex portion 32a is formed continuously in the peripheral direction in the annular fitting portion 18a of the core 18. When the annular convex portion fits into the annular concave portion, the adhesion between the annular inner wall of the boot main body Pm and the annular fitting portion 18a of the core 18 is enhanced.

It is to be noted that, conversely, the annular concave portion continuous in the peripheral direction is integrally molded with the annular inner wall of the boundary region L of the boot main body Pm at the primary molding time. Moreover, the annular convex portion capable of engaging with the annular concave portion is formed continuously in the peripheral direction in the annular fitting portion 18a of the core 18, and the annular concave and convex portions may also be engaged with each other.

Moreover, to enhance the adhesion of the inner periphery of the other-end annular fastening portion P3 of the tripod boot with respect to the gear housing 2b of the tripod joint 2 (see FIGS. 8A and 8B), one or more sealing pieces 34 continuous in the peripheral direction are preferably integrally molded in the inner peripheries of the portions having different thicknesses (thick portion T1, thin portion T2) at the secondary molding time. When the sealing pieces 34 are secondarily molded, sealing piece molding concave portions 34a (see FIG. 4) matching the shapes of the sealing pieces 34 may be disposed beforehand in the secondary molding defining portion 18b of the core 18. According to the sealing pieces 34, the adhesion of the inner periphery of the other-end annular fastening portion P3 of the tripod boot with respect to the gear housing 2b of the tripod joint 2 is enhanced, and this can prevent leakage of grease to the outside from the gear housing 2b or the invasion of dust or the like into the gear housing 2b from the outside.

Furthermore, when at least one or more of a convex portion 8a and a concave portion 8b are formed simultaneously in the inner periphery of the other-end annular fastening portion P3 of the boot main body Pm at the primary molding time, fusion bond to the portions having different thicknesses (thick portion T1, thin portion T2) is solidified at the secondary molding time.

In the present embodiment, a plurality of convex portions 8a and concave portions 8b continuous in the peripheral direction are alternately disposed in a height direction of the inner periphery of the other-end annular fastening portion P3 of the boot main body Pm which is the primary molded member. Therefore, a fusion bond area between the inner periphery of the other-end annular fastening portion P3 of the boot main body Pm and the portions having different thicknesses (thick portion T1, thin portion T2) is enlarged, and the inner periphery is firmly fusion-bonded to the portions. It is to be noted that in the present embodiment, a plurality of convex portions 8a and concave portions 8b are disposed, but the present invention is not interpreted in a limited manner to this constitution, as long as the fusion bonding is reinforced as described above. For example, one or a plurality of protrusions or dents may also be disposed, and in this case the length of the protrusion or the like may be optionally set.

Especially when the convex portions 8a are formed on the inner periphery of the other-end annular fastening portion P3 of the boot main body Pm, the convex portions 8a also serve as weirs, and the thermoplastic resin injected into the thin portion molding space S2 from the gate 30 of the runner mechanism is allowed to uniformly flow into the thick portion molding space S1. That is, when the convex portion 8a is formed as the weir, the high-speed/temperature thermoplastic resin injected into the thin portion molding space S2 first flows toward the thick portion molding space S1 along a flowing space (flowing space above the convex portion 8a) between the gate 30 and the convex portion 8a, subsequently flows into a flowing space under the convex portion 8a, and flows after the flowing space. Moreover, the thermoplastic resins which have flown along the respective flowing spaces simultaneously reach the thick portion molding space S1. In this case, the height/length of the convex portion 8a are preferably adjusted in such a manner that the thermoplastic resins which have flown into a plurality of flowing spaces simultaneously reach the thick portion molding space S1.

It is to be noted that the convex portion 8a may be formed on the inner periphery of the other-end annular fastening portion P3 of the boot main body Pm facing at least the thin portion molding space S2. The convex portion 8a is optionally disposed in accordance with use purpose or environment of the tripod boot, and the number of boots may be appropriately designed/changed.

Moreover, when injection conditions of the thermoplastic resin into the secondary molding space (thin portion molding space S2) are set as follows, the fusion bond between the boot main body Pm that is the primary molded member and the portions having different thicknesses of the tripod boot that is the second molded member is further reinforced.

For example, as shown in FIG. 4A, a direction θ [degrees] of the gate 30 is set in a range of 0<θ<90 with respect to the inner periphery of the other-end annular fastening portion P3 of the boot main body Pm. Moreover, assuming that a distance between the inner periphery of the other-end annular fastening portion P3 of the boot main body Pm and the gate 30 is t, and a distance of an end portion on an injection side of the thin portion molding space S2 in the diametric direction is a, positional conditions of the gate 30 are set to $0 \leq t \leq 2a/3$.

Accordingly, the thermoplastic resin at the high temperature is injected at a high speed in such a manner that the resin is brought into sliding contact with the inner periphery of the other-end annular fastening portion P3 of the boot main body Pm, and the thermoplastic resin is charged into the thin portion molding space S2.

Moreover, at this time, the thermoplastic resin injected at the high temperature flows at the high speed in the sliding contact with the inner periphery of the other-end annular fastening portion P3. Therefore, impurities of a material for the primary molding, attached to the inner peripheral surface of the other-end annular fastening portion P3, are pushed out, and heat of the thermoplastic resin flowing onto the inner peripheral surface at the high temperature/speed is transmitted to fuse the surface. Therefore, the injected thermoplastic resin firmly fusion-bonds to the surface of the other-end annular fastening portion P3 fused by the heat of the thermoplastic resin, and the portions having different thicknesses are integrally and secondarily molded on the inner periphery of the other-end annular fastening portion P3.

Furthermore, in the present embodiment, the portions are secondarily molded on the inner periphery of the other-end annular fastening portion P3 of the boot main body Pm (between the core 18 and the other-end annular fastening portion P3). However, by the secondary molding on the outer periphery of the other-end annular fastening portion P3 (between the divided molds 14a, 14b and the other-end annular fastening portion P3, between the core 18 and the divided molds 14a, 14b via the other-end annular fastening portion P3), the same object can be achieved. For example, in the secondary molding between the divided molds 14a, 14b and the other-end annular fastening portion P3, the other-end annular fastening portion P3 is molded beforehand in an inner surface shape (concave/convex form in the peripheral direction) facing the tripod boot at the time of the primary molding of the boot main body Pm, and the primarily molded boot main body Pm is set in the mold. Moreover, the core 18 including the concave/convex outer surface shape matching the inner surface shape of the other-end annular fastening portion P3 formed in the concave/convex manner is inserted into the other-end annular fastening portion P3, and the secondary molding space is formed between the outer periphery of the other-end annular fastening portion P3 and the mold inner surface to clamp the molds. Thereafter, when the thermoplastic resin is injected into the secondary molding space, the other-end annular fastening portion P3 including a perfectly circular outer peripheral shape and an inner peripheral surface having different thicknesses is integrally molded. In this case, the conditions such as injection conditions by the gates 30 can be set in the same manner as in the above-described embodiment. According to the manufacturing method, the secondarily molded fusion bonded portion is outside the boot main body Pm. Therefore, if a fusion bond defect is caused, there is no fear that the grease leaks in the tripod boot. It is to be noted that a concrete apparatus or method for the secondary molding on the outer periphery of the other-end annular fastening portion P3 (between the divided molds 14a, 14b and the other-end annular fastening portion P3, between the core 18 and the divided molds 14a, 14b via the other-end annular fastening portion P3) will be described later (see FIGS. 5A to 5C, 6A and 6B, 7A and 7B).

Moreover, the method for enhancing the adhesion between the annular inner wall of the boundary region L of the boot main body Pm and the annular fitting portion 18a of the core 18 at the secondary molding time is not limited to the constitution shown in FIG. 4A. For example, as shown in FIG. 4B, at the primary molding time, the boundary region L of the boot main body Pm is protruded/molded inwards beyond the thin portion molding space S2, and the corresponding portion is held between the divided molds 14a, 14b and the core 18. When the thermoplastic resin is injected into the thin portion molding space S2 at the high temperature/speed in this state, a portion Pk (portion in the vicinity of the protruded portion of the boot main body Pm) onto which an injection force σ1 is applied tries to expand in an arrow direction Ad. However, the core 18 and divided molds 14a, 14b exist in the direction Ad, and a so-called dead end is formed. At this time, the portion Pk in the vicinity of the protruded portion in the boot main body Pm is maintained in a stretching state (pressing state) between the core 18 and the divided molds 14a, 14b. As a result, the adhesion between the annular inner wall of the boundary region L of the boot main body Pm at the secondary molding time and the annular fitting portion 18a of the core 18 is enhanced, and a so-called self-sealing effect is produced.

As described above, an ejection mechanism is disposed in the manufacturing apparatus of the present embodiment in order to smoothly remove (release) the tripod boot completed through the respective molding steps (primary and secondary molding steps) from the mold without deforming the boot.

For example, as shown in FIGS. 1A to 1C, 2A to 2D, 3A to 3D, the ejection mechanism is provided with a plurality of ejectors 36 in positions avoiding the gates 30 of the above-described runner mechanism. When a predetermined ejecting force is applied onto the lower end surface E of the other-end annular fastening portion P3 of the tripod boot from these ejectors 36, the tripod boot can be stably and smoothly removed from the core 18. It is to be noted that the fixed mold 16 is provided with the other runner mechanism constitutions including the gates 30 (nozzle 24, sprue 26, runner 28). Therefore, to dispose the ejectors 36, an arrangement state of these constitutions need to be considered.

Each of the ejectors 36 is constitute to be freely protruded/retrojected on the fixed mold 16 via a through hole 38 formed in the fixed mold 16. To realize the constitution, a base end of the ejector 36 is connected to an actuator 42 via a piston rod 40. It is to be noted that, for example, the existing hydraulic cylinder or the like is usable as the actuator 42. When the actuator 42 is operated to reciprocate/move the piston rod 40, the ejector 36 can be protruded or retrojected with respect to the fixed mold 16.

To remove the tripod boot from the core 18, in a state in which the divided molds 14a, 14b are opened as shown, for example, in FIG. 3A, the ejector 36 is ejected in an arrow direction, and an ejecting force is applied onto the lower end surface E of the other-end annular fastening portion P3 of the tripod boot. In this case, after the end of the secondary molding, the tripod boot is maintained in a restricted state by the core 18, and therefore the arrangement of the respective ejectors 36 is not balanced. When a non-uniform ejecting force is applied, the tripod boot is sometimes deformed or cracked.

Then, in the present embodiment, the respective ejectors 36 are disposed at predetermined intervals along the lower end surface E in positions which do not contact the core 18, so that the uniform ejecting force is applied onto the lower end surface E of the other-end annular fastening portion P3 of the tripod boot. This avoids a situation in which, for example, the ejector 36 contacts the core 18, the ejecting force accordingly changes (decreases), the ejector 36 changes its direction by the contact, and the non-uniform ejecting force is applied onto the lower end surface E of the other-end annular fastening portion P3. When the ejectors 36 are disposed at predetermined intervals, the uniform ejecting force can be applied over the whole lower end surface E.

Here, the lower end surface E of the other-end annular fastening portion P3 of the tripod boot is a surface in a range obtained by combining the thickness of the other-end annular fastening portion P3 of the primarily molded boot main body Pm with that of the thermoplastic resin charged into the secondary molding space (thick portion molding space S1 and thin portion molding space S2). Concretely, for example, in a portion in which the thick portion T1 is secondarily molded, a range obtained by combining a lower end surface T1e of the thick portion T1 in the other-end annular fastening portion P3 with a lower end surface Pme of the boot main body Pm constitutes the lower end surface E. For example, in a portion in which the thin portion T2 is secondarily molded, a range obtained by combining a lower end surface T2e of the thin portion T2 in the other-end annular fastening portion P3 with the lower end surface Pme of the boot main body Pm constitutes the lower end surface E (see FIG. 1B).

Each of the ejectors 36 has the same shape (same sectional shape) to its tip from its base end (end portion connected to the piston rod 40). Abutment surfaces 36a which abut on the lower end surface E of the other-end annular fastening portion P3 to apply the ejecting force are disposed on the tips of the respective ejectors 36. At least the abutment surfaces 36a have such shapes that a contact area with respect to the lower end surface E increases.

When the contact area of the abutment surface 36a with respect to the lower end surface E is small, the ejecting force acts on concentrated portions, and the inner peripheral surface of the other-end annular fastening portion P3 of the primarily molded boot main body Pm sometimes peels off from the thick and thin portions T1, T2 secondarily molded of the thermoplastic resin on the inner peripheral surface. When this peeling occurs, an adhesion force between the inner peripheral surface of the other-end annular fastening portion P3 and the thick and thin portions T1, T2 drops, and the grease sometimes leaks. With the concentration of the portions onto which the ejecting force is applied, an ejecting trace is sometimes formed on the concentrated portion, the ejecting trace is conspicuous, and burrs are easily generated in the ejecting trace. Moreover, the ejecting trace not only lowers a value of a product but also impairs a function of the tripod boot which is a molded member.

However, when the contact area with respect to the lower end surface E of the abutment surface 36a is enlarged, the portions onto which the ejecting force is applied are scattered, and the force broadly acts on the lower end surface E. Therefore, the peeling does not occur. Additionally, the ejecting traces are not easily left, and the above-described problems can be solved.

Figures 2A, 2B:
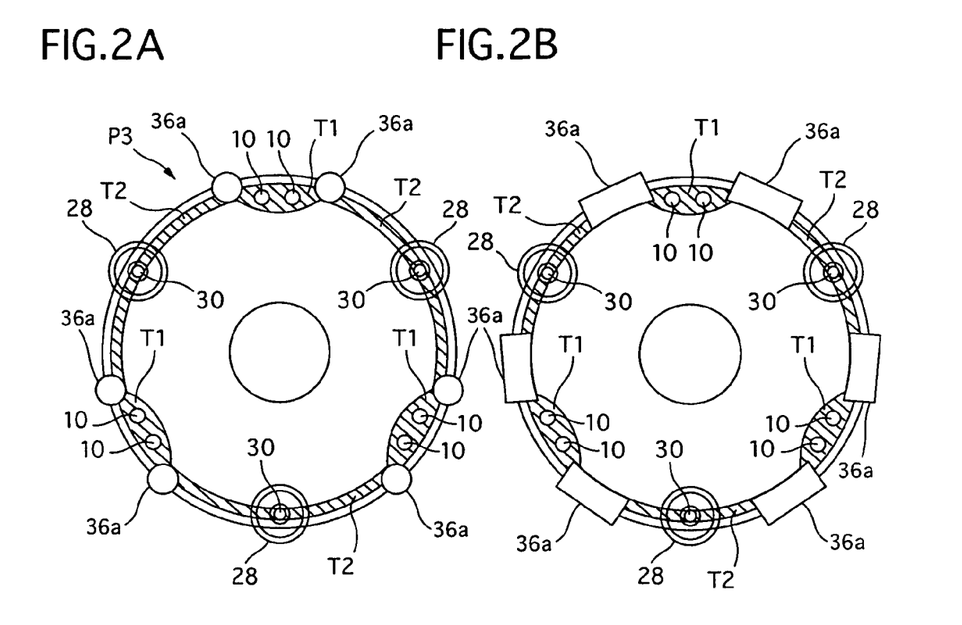
FIG. 2A is a diagram showing abutment positions of ejectors with respect to the lower end surface of the resin boot for the constant-velocity universal joint (other-end annular fastening portion) and showing that the ejector having a circular abutment surface abuts over both thick and thin portions.
FIG. 2B is a diagram showing abutment positions of ejectors with respect to the lower end surface of the resin boot for the constant-velocity universal joint (other-end annular fastening portion) and showing that the ejector having a broad abutment surface abuts over both the thick and thin portions.
Figure 2C:
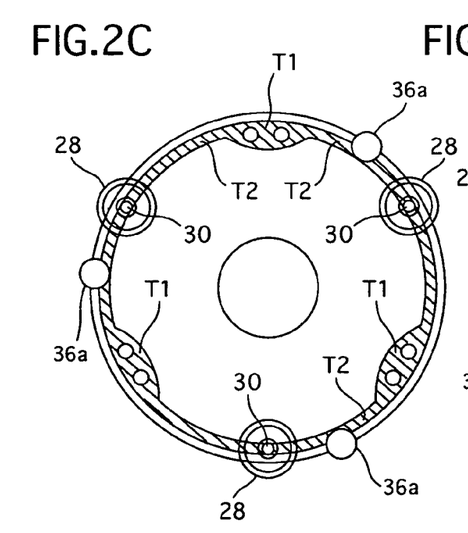
FIG. 2C is a diagram showing the abutment positions of the ejectors with respect to the lower end surface of the resin boot for the constant-velocity universal joint (other-end annular fastening portion) and showing that the ejector having the circular abutment surface abuts on the thin portion.

As the shape of the ejector 36a which produces the effect, for example, the circular shapes such as circle, semi-circle, and bow shapes (see FIGS. 2A and 2C), or a broad shape which does not contact the core 18 when abutting on the lower end surface E of the other-end annular fastening portion P3 and which extends along the lower end surface E of the thin portion T2 of the other-end annular fastening portion P3 (see FIGS. 2B and 2D) may be applied. It is to be noted that attentions need to be paid in order to bring the circular abutment surface 36a into an abutment position which does not contact the core 18 at the time of the ejecting time of each ejector 36. In this case, for example, as shown in FIGS. 2A and 2C, the arrangement or direction of each ejector 36 may be adjusted in such a manner that an innermost periphery of each abutment surface 36a matches the inner periphery of the thin portion T2 or is positioned before the inner periphery of the thin portion. It is to be noted that when the shape of the abutment surface 36a (ejector 36) is changed as described above, the through hole 38 is designed to be broader than the outer shape of the abutment surface 36a (ejector 36) and to substantially match the outer shape.

In consideration of the above-described conditions, the ejectors 36 are preferably disposed at predetermined intervals along the corresponding lower end surface E in such a manner that the ejecting forces individually act on the lower end surfaces E of the thin portion T2, thick portion T1, and portion extending over both the thick and thin portions T1, T2 among the secondarily molded portions having different thicknesses on the inner periphery of the other-end annular fastening portion P3, or that the ejecting forces simultaneously act on the plurality of lower end surfaces E obtained by optionally selecting two or more from the above-described lower end surfaces.

Figure 2D:
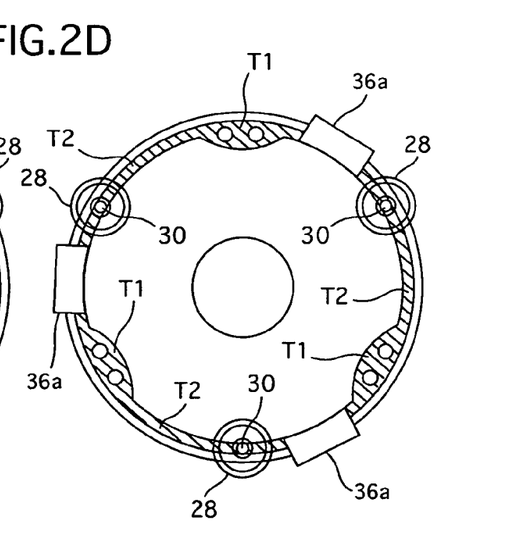
FIG. 2D is a diagram showing the abutment positions of the ejectors with respect to the lower end surface of the resin boot for the constant-velocity universal joint (other-end annular fastening portion) and showing that the ejector having the broad abutment surface abuts on the thin portion.

Concrete examples of the abutment position of the ejector 36 with respect to the lower end surface E are shown in FIGS. 2A to 2D. In the example of FIG. 2A, the abutment surfaces 36a having the circular shapes such as the circle, semi-circle, and bow shapes are constituted to apply the ejecting force onto the lower end surfaces E of the portions extending over both the thick and thin portions T1, T2 (portion on opposite sides of the thick portion T1 and in the vicinity of the thin portion T2). In the example of FIG. 2B, each abutment surface 36a having the broad shape which does not contact the core 18 during the abutment on the lower end surface E of the other-end annular fastening portion P3 and which extends along the lower end surface E of the thin portion T2 of the other-end annular fastening portion P3 is constituted to apply the ejecting force onto the lower end surface E of the portion extending over both the thick and thin portions T1, T2 (portion on the opposite sides of the thick portion T1 and in the vicinity of the thin portion T2). Furthermore, as shown in FIGS. 2C and 2D, each abutment surface 36a may also be constituted to be positioned in one portion of each thin portion T2.

It is to be noted that the abutment positions shown in FIGS. 2A to 2D only illustrate the examples. Needless to say, in consideration of the configuration, size, material and the like of the tripod boot, the number of abutment surfaces 36a may be increased, or the abutment positions may be changed.

Figures 3B, 3C:
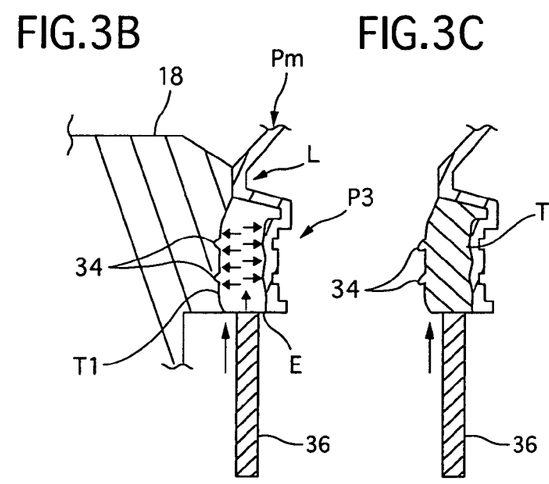
FIG. 3B is a diagram showing a state of an inner force generated in the thick portion, when an ejecting force is applied onto the thick portion by the ejector.
FIG. 3C is a diagram showing a deformed state of a sealing piece of the thick portion, when the boot is forcibly removed from the mold in the state of FIG. 3B.

It is to be noted that as the problem of the abutment position, when the abutment surface 36a is positioned only in the thick portion T1 as shown, for example, in FIG. 3B, the following respects need to be considered.

A cooled state of the other-end annular fastening portion P3 of the tripod boot after (immediately after) the end of the secondary molding is not complete (in a soft state in which the portion does not completely solidify (harden)). Therefore, when the other-end annular fastening portion P3 of the tripod boot is ejected from the core 18, the portion to which the ejecting force of the ejector 36 is applied is compressed in a vertical direction (ejecting direction of the ejector) and expanded in a lateral direction. The portion is pressure-welded to the core 18, and the tripod boot which is the second molded member is not easily removed (released) from the core 18.

When the tripod boot is forcibly removed from the core 18 in this state, the portion pressure-welded to the core 18 (e.g., the sealing piece 34) is sometimes deformed (see FIG. 3C). FIG. 3C illustrates the sealing pieces 34 deformed in a direction opposite to a mold releasing direction. When the sealing pieces 34 are deformed in this manner, the grease easily leaks to the outside.

Figure 3D:
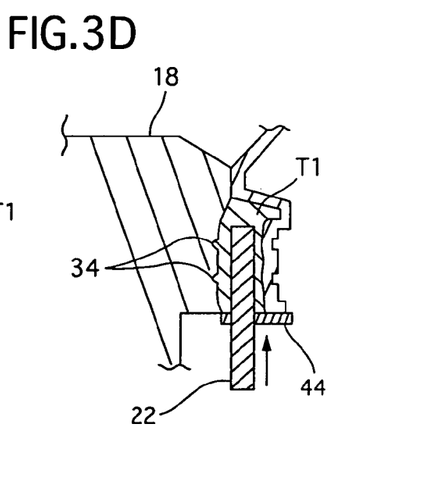
FIG. 3D is a diagram showing an example of combined use of a rod for molding a cylindrical concave portion as the ejector in order to reduce a weight of a tripod boot or to prevent kinks.

In this case, to smoothly remove the tripod boot from the core 18 without deforming the tripod boot (especially the other-end annular fastening portion P3), for example, the abutment surface 36a of the ejector 36 is set to such a size that the whole thick portion T1 is covered. Alternatively, for example, as shown in FIG. 3D, the rod 22 for molding the cylindrical concave portion 10 on the thick portion T1 (see FIG. 1C) is also used as the ejector, and an operating plate 44 may also be disposed in a part of the rod 22 for molding the cylindrical concave portion. Then, when the rod 22 for molding the cylindrical concave portion is ejected, the ejecting force is uniformly applied onto the whole thick portion T1 from the operating plate 44, and the thick portion T1 can be prevented from being deformed.

It is to be noted that in the above-described embodiment, the secondary molding on the inner periphery of the other-end annular fastening portion P3 of the boot main body Pm (between the core 18 and the other-end annular fastening portion P3) has been described in detail. A concrete apparatus and method for the secondary molding on the inner/outer periphery of the other-end annular fastening portion P3 (between the divided molds 14a, 14b and the other-end annular fastening portion P3, between the core 18 and the divided molds 14a, 14b via the other-end annular fastening portion P3) will be described hereinafter in detail.

Figure 5A:
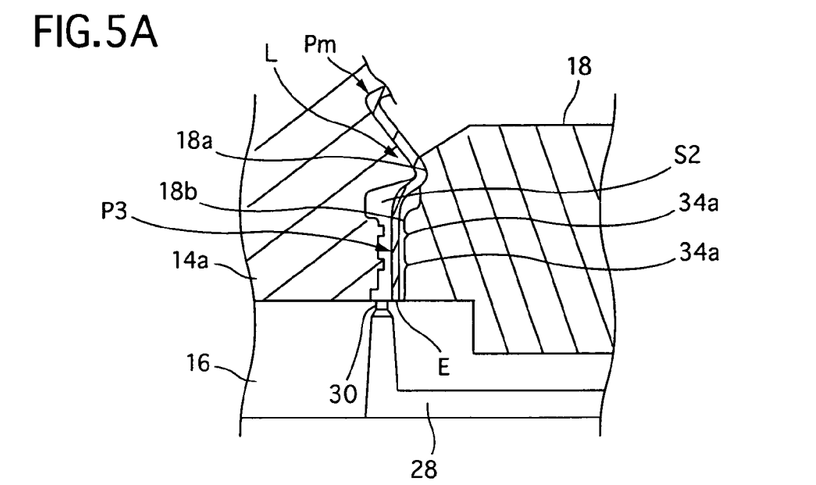
FIG. 5A is a partially sectional view showing an apparatus constitution in which the secondary molding space is formed in an outer periphery of the other-end annular fastening portion of the boot main body (between the divided molds and the other-end annular fastening portion)
Figure 5B:
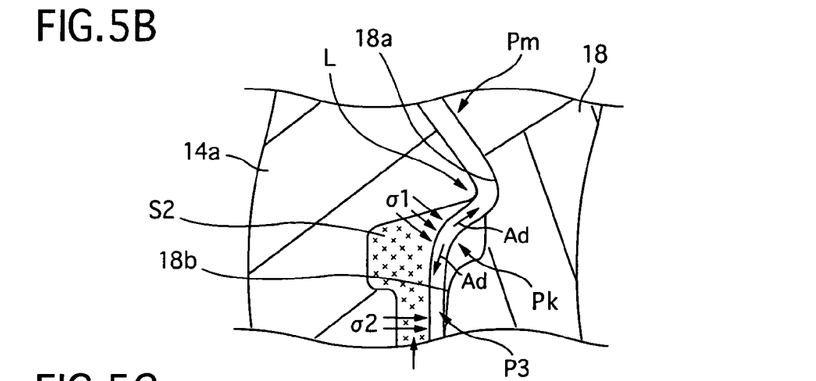
FIG. 5B is an enlarged sectional view of the secondary molding space of FIG. 5A.
Figure 5C:
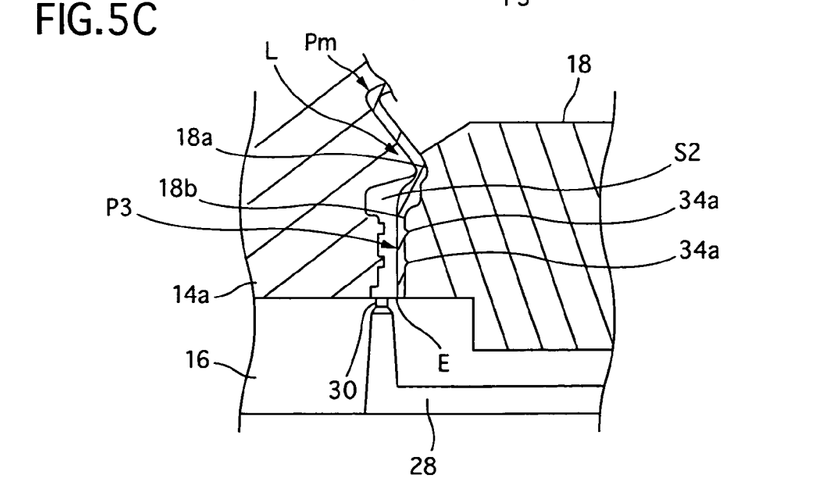
FIG. 5C is a partially sectional view showing a modification of the apparatus constitution in which the secondary molding space is formed in the outer periphery of the other-end annular fastening portion of the boot main body.

FIGS. 5A and 5B illustrate an apparatus constitution for the secondary molding on the outer periphery of the other-end annular fastening portion P3 of the boot main body Pm (between the divided molds 14a, 14b and the other-end annular fastening portion P3). In the apparatus constitution, the other-end annular fastening portion P3 has, for example, a substantially straight cylindrical shape. In this case, the other-end annular fastening portion P3 is positioned apart from the secondary molding defining portion 18b of the core 18 in a state in which the boot main body Pm is set between the core 18 and the divided molds 14a, 14b. Furthermore, the gate 30 of the runner mechanism is positioned facing the secondary molding space formed between the divided molds 14a, 14b and the other-end annular fastening portion P3 (outer periphery of the other-end annular fastening portion P3). It is to be noted that the drawing illustrates the thin portion molding space S2 as an example. Since the thick portion molding space S (see FIG. 1C) is also similar to the thin portion molding space, the description thereof is omitted.

When the thermoplastic resin is injected into the secondary molding space (S1, S2) from the gate 30 at the high temperature/speed in this state, the other-end annular fastening portion P3 is heated to soften, and is simultaneously pressed toward the secondary molding defining portion 18b of the core 18. Concretely, the portion (portion in the vicinity of the protruding portion of the boot main body Pm) Pk to which the injection force σ1 is applied is expanded in the arrow direction Ad and simultaneously pressed by the secondary molding defining portion 18b. At this time, the portion Pk in the vicinity of the protruding portion is maintained in a stretching state (state of pressing the core and divided molds) with respect to the boundary region L between the core 18 an dh divided molds 14a, 14b. As a result, the adhesion between the annular inner wall of the boundary region L of the boot main body Pm at the secondary molding time and the annular fitting portion 18a of the core 18 or between the annular outer wall of the boundary region L of the boot main body Pm and the divided molds 14a, 14b is enhanced, and a so-called self-sealing effect is produced.

On the other hand, the portion, onto which the injection force σ2 is applied is heated to soften, pressure-welded to the secondary molding defining portion 18b, and partially enters the sealing piece molding concave portions 34a of the secondary molding defining portion 18b to transfer the sealing piece 34 (see FIG. 1A) onto the inner periphery of the other-end annular fastening portion P3 of the boot main body Pm.

Figure 7A:
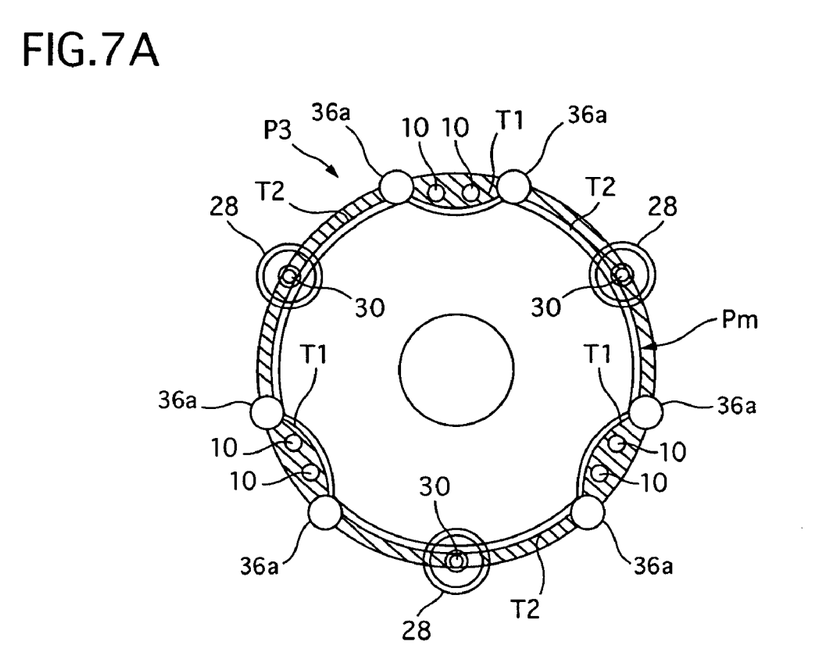
FIG. 7A is a diagram showing abutment positions of the ejectors with respect to the lower end surface of the resin boot for the constant-velocity universal joint (other-end annular fastening portion) molded by the apparatus constitution of FIGS. 5A to 5C.

Moreover, when the charging of the thermoplastic resin into the secondary molding space (S1, S2) ends, for example, as shown in FIG. 7A, the thick and thin portions T1, T2 are integrally molded of the thermoplastic resin on the outer periphery of the other-end annular fastening portion P3 of the boot main body Pm to complete the tripod boot. It is to be noted that in the drawing, the secondarily molded portion of the thermoplastic resin is hatched, and the portion of the boot main body Pm which is the primary molded member is shown in the white background.

Thereafter, when the tripod boot is removed (released) from the injection mold 12 (see FIG. 1C), the ejecting force may be applied to the lower end surface E of the other-end annular fastening portion P3 by the ejector 36 in the same manner as in the above-described embodiment.

It is to be noted that as a modification of FIGS. 5A and 5B, the other-end annular fastening portion P3 of the boot main body Pm which is the primary molded member may be formed to match the secondary molding defining portion 18b of the core 18. In this case, the sealing pieces 34 (see FIG. 1A) are integrally molded on the inner periphery of the other-end annular fastening portion P3 at the primary molding time. At the secondary molding time, the boot main body Pm is set between the core 18 and the divided molds 14a, 14b, and the inner periphery of the other-end annular fastening portion P3 and the sealing pieces 34 are positioned in accordance with the outer periphery of the secondary molding defining portion 18b and the sealing piece molding concave portions 34a. Moreover, the gates 30 of the runner mechanism are positioned facing the secondary molding spaces formed between the divided molds 14a, 14b and the other-end annular fastening portion P3. When the thermoplastic resin is injected into the secondary molding space (S1, S2) from the gate 30 at the high temperature/speed in this state, for example, as shown in FIG. 7A, the thick and thin portions T1, T2 are integrally molded of the thermoplastic resin on the outer periphery of the other-end annular fastening portion P3 of the boot main body Pm to complete the tripod boot.

Figure 6A:
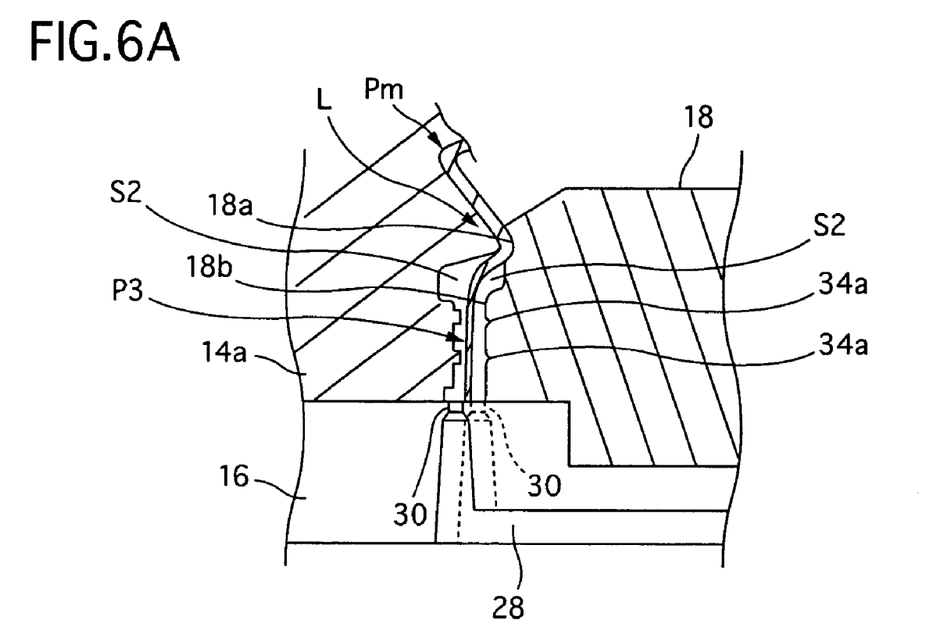
FIG. 6A is a partially sectional view showing an apparatus constitution in which the secondary molding space is formed in an inner/outer periphery of the other-end annular fastening portion of the boot main body (between the core and the divided molds via the other-end annular fastening portion)
Figure 6B:
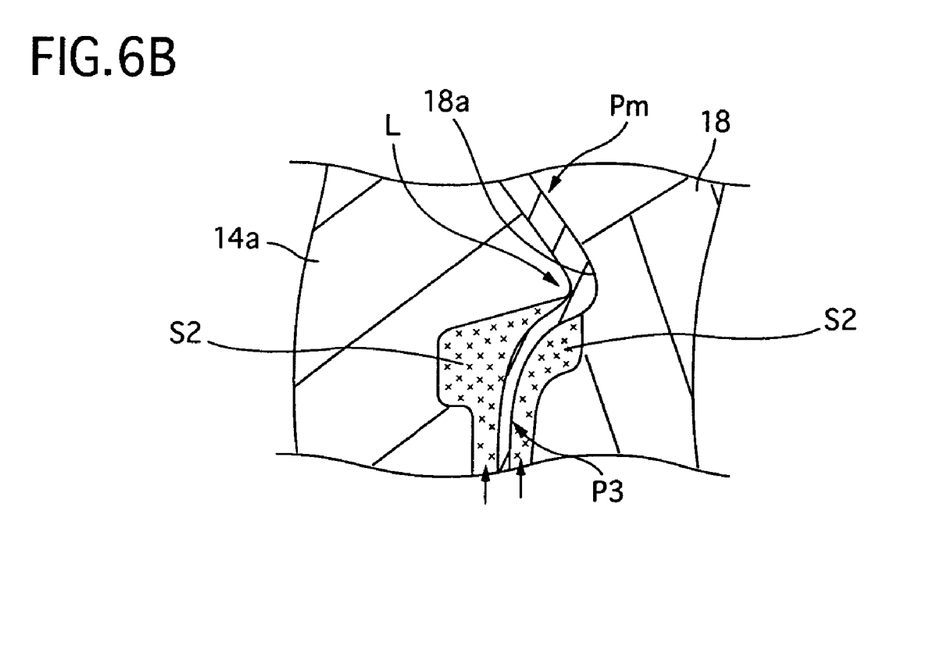
FIG. 6B is an enlarged sectional view of the secondary molding space of FIG. 6A.

Moreover, FIGS. 6A and 5B illustrate an apparatus constitution for the secondary molding on the inner/outer periphery of the other-end annular fastening portion P3 of the boot main body Pm (between the core 18 and the divided molds 14a, 14b via the other-end annular fastening portion P3). In this apparatus constitution, the other-end annular fastening portion P3 forms, for example, a substantially straight cylindrical shape. In this case, while the boot main body Pm is set between the core 18 and the divided molds 14a, 14b, the other-end annular fastening portion P3 is positioned apart from the divided molds 14a, 14b and the secondary molding defining portion 18b of the core 18. In other words, the other-end annular fastening portion P3 is positioned between the divided molds 14a, 14b and the secondary molding defining portion 18b of the core 18. Moreover, the gates 30 of the runner mechanism are positioned facing the secondary molding spaces formed between the divided molds 14a, 14b and the other-end annular fastening portion P3 (outer periphery of the other-end annular fastening portion P3) and between the secondary molding defining portion 18b and the other-end annular fastening portion P3 (inner periphery of the other-end annular fastening portion P3). It is to be noted that in the drawing, the thin portion molding space S2 is shown as an example. Since the thick portion molding space S1 (see FIG. 1C) is similar to the thin portion molding space, the description is omitted.

Figure 7B:
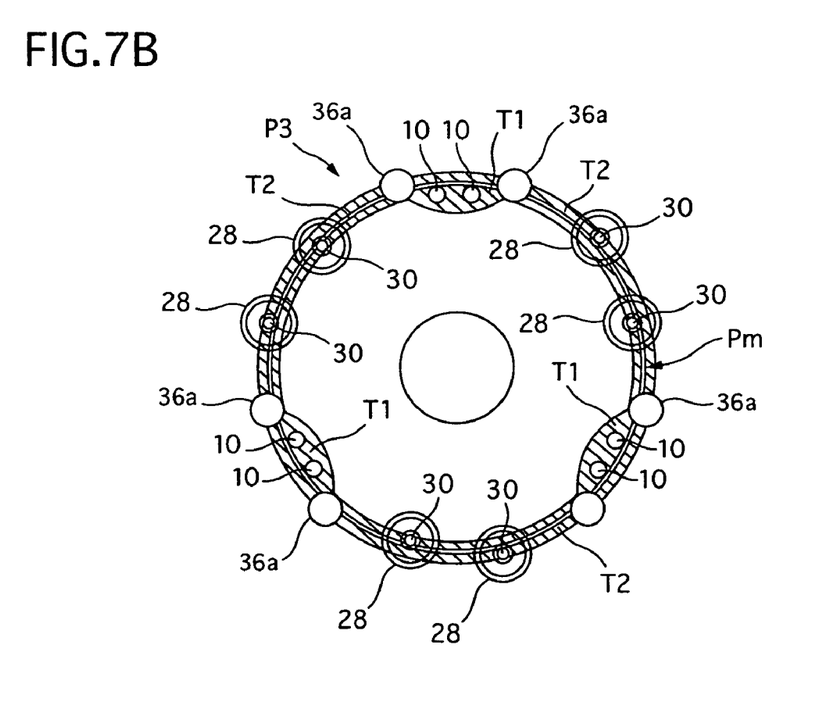
FIG. 7B is a diagram showing abutment positions of the ejectors with respect to the lower end surface of the resin boot for the constant-velocity universal joint (other-end annular fastening portion) molded by the apparatus constitution of FIGS. 6A and 6B.

When the thermoplastic resin is injected into the secondary molding spaces (S1, S2) formed in the inner/outer peripheries of the other-end annular fastening portion P3 from the gates 30 at the high temperature/speed in this state, for example, as shown in FIG. 7B, the thick and thin portions T1, T2 are integrally molded of the thermoplastic resin on the inner/outer peripheries of the other-end annular fastening portion P3 of the boot main body Pm to complete the tripod boot. It is to be noted that in the drawing, the secondarily molded portion of the thermoplastic resin is hatched, and the portion of the boot main body Pm which is the primary molded member is shown in the white background.

Thereafter, when the tripod boot is removed (released) from the injection mold 12 (see FIG. 1C), the ejecting force may be applied onto the lower end surface E of the other-end annular fastening portion P3 by the ejector 36 in the same manner as in the above-described embodiment.

It is to be noted that FIGS. 7A and 7B show an example in which the circular abutment surface 36a of the ejector 36 abuts on the portion extending over both the thick and thin portions T1, T2, but the present invention is not limited to this example. The abutment surfaces 36a may also abut, for example, as shown in FIG. 2C, or the shapes of the abutment surfaces 36a shown in FIGS. 2B and 2D may also be used.

What is claimed is:

1. A manufacturing method in which a boot main body primarily molded of a resin is held in an injection mold, a molten resin material is injected/charged in a secondary molding space formed in the injection mold in this state, portions having different thicknesses are secondarily molded on an other-end annular fastening portion of the boot main body to constitute a boot for a constant-velocity universal joint, formed of the resin, and thereafter the boot for the constant-velocity universal joint, formed of the resin, can be removed from the injection mold, the manufacturing method comprising the steps of:

holding the primarily molded resin boot main body from the outside by divided molds;

holding the boot main body from the inside by a core;

injecting/charging a molten resin material into a secondary molding space constituted of a thick portion molding space and a thin portion molding space formed between the core and the other-end annular fastening portion, between the divided molds and the other-end annular fastening portion, or between the core and the divided molds via the other-end annular fastening portion by a runner mechanism; and removing, from the core, the resin boot for the constant-velocity universal joint in which the molten resin material is charged into the secondary molding space to integrally and secondarily mold portions having different thicknesses, constituted by combining a thickness of the molten resin material in the secondary molding space with that of the boot main body, on the other-end annular fastening portion by an ejection mechanism, the runner mechanism being provided with injecting/charging gates for injecting/charging the molten resin materials onto optional one or a plurality of positions of the secondary molding space, the ejection mechanism being provided with a plurality of ejectors in positions avoiding the injecting/charging gates of the runner mechanism, wherein predetermined ejecting forces are applied onto lower end surfaces of the portions having different thicknesses in the other-end annular fastening portion of the resin boot for the constant-velocity universal joint from the plurality of ejectors to remove the resin boot for the constant-velocity universal joint from the core.

2. The manufacturing method for the resin boot for the constant-velocity universal joint according to claim 1, wherein the ejectors are disposed at predetermined intervals along the lower end surface in positions which do not contact the core, so that uniform ejecting forces are applied onto the lower end surface of the other-end annular fastening portion of the resin boot for the constant-velocity universal joint.

3. The manufacturing method for the resin boot for the constant-velocity universal joint according to claim 1, wherein the ejectors are disposed at predetermined intervals along the lower end surface in order to individually apply the ejecting forces onto the lower end surface of a portion in which a thin portion is molded, the lower end surface of a portion in which a thick portion is molded, and the lower end surface of a portion which extends over both the thick and thin portions in the portions having different thicknesses, or to simultaneously apply the ejecting forces onto two or more lower end surfaces selected and combined optionally from these lower end surfaces.

4. The manufacturing method for the resin boot for the constant-velocity universal joint according to claim 1, wherein a tip of the ejector is provided with an abutment surface which abuts on the lower end surface of the other-end annular fastening portion to apply the ejecting force, and at least the abutment surface has such a shape that a contact area with respect to the lower end surface increases.

5. The manufacturing method for the resin boot for the constant-velocity universal joint according to claim 2, wherein a tip of the ejector is provided with an abutment surface which abuts on the lower end surface of the other-end annular fastening portion to apply the ejecting force, and at least the abutment surface has such a shape that a contact area with respect to the lower end surface increases.

6. The manufacturing method for the resin boot for the constant-velocity universal joint according to claim 3, wherein a tip of the ejector is provided with an abutment surface which abuts on the lower end surface of the other-end annular fastening portion to apply the ejecting force, and at least the abutment surface has such a shape that a contact area with respect to the lower end surface increases.

7. The manufacturing method for the resin boot for the constant-velocity universal joint according to claim 4, wherein at least the abutment surface of the ejector has a circular shape.

8. The manufacturing method for the resin boot for the constant-velocity universal joint according to claim 5, wherein at least the abutment surface of the ejector has a circular shape.

9. The manufacturing method for the resin boot for the constant-velocity universal joint according to claim 6, wherein at least the abutment surface of the ejector has a circular shape.

10. The manufacturing method for the resin boot for the constant-velocity universal joint according to claim 4, wherein at least the abutment surface of the ejector has a broad shape which does not contact the core during the abutting on the lower end surface of the other-end annular fastening portion and which extends along the lower end surface of the thin portion of the other-end annular fastening portion.

11. The manufacturing method for the resin boot for the constant-velocity universal joint according to claim 5, wherein at least the abutment surface of the ejector has a broad shape which does not contact the core during the abutting on the lower end surface of the other-end annular fastening portion and which extends along the lower end surface of the thin portion of the other-end annular fastening portion.

12. The manufacturing method for the resin boot for the constant-velocity universal joint according to claim 6, wherein at least the abutment surface of the ejector has a broad shape which does not contact the core during the abutting on the lower end surface of the other-end annular fastening portion and which extends along the lower end surface of the thin portion of the other-end annular fastening portion.

* * * * *